United States Patent
Sokolov et al.

(10) Patent No.: US 7,181,724 B2
(45) Date of Patent: Feb. 20, 2007

(54) REPRESENTATION OF JAVA® DATA TYPES IN VIRTUAL MACHINES

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 625 days.

(21) Appl. No.: 09/886,530

(22) Filed: Jun. 20, 2001

(65) Prior Publication Data

US 2002/0199169 A1    Dec. 26, 2002

(51) Int. Cl.
*G06F 9/44* (2006.01)
(52) U.S. Cl. .................... 717/116; 717/108; 717/118; 719/332
(58) Field of Classification Search ............. 717/114, 717/116, 118, 39, 148; 707/103; 719/315, 719/316
See application file for complete search history.

(56) References Cited

U.S. PATENT DOCUMENTS

| | | | | |
|---|---|---|---|---|
| 5,367,685 | A * | 11/1994 | Gosling | 717/148 |
| 6,006,230 | A * | 12/1999 | Ludwig et al. | 707/10 |
| 6,106,569 | A * | 8/2000 | Bohrer et al. | 717/100 |
| 6,581,206 | B2 * | 6/2003 | Chen | 717/143 |
| 6,711,576 | B1 * | 3/2004 | Tuck et al. | 707/100 |
| 2002/0078255 | A1 * | 6/2002 | Narayan | 709/316 |
| 2003/0079049 | A1 * | 4/2003 | Sokolov | 709/320 |

OTHER PUBLICATIONS

Kayshav Dattatri, "C++: Effective Object-Oriented Software Construction", 2000, Prentice Hall PTR, ISBN 0-13-086769-1, pp. 568-575.*

Steve Oualline, "Practical C++ Programming", 1997, O'Reilly & Associates, ISBN 1-56592-139-9, pp. 227-247.*

Aho, Sethi, and Ullman, "Compilers: Principles, Techniques, and Tools", 1986, Addison-Wesley, ISBN 0-201-10088-6, Chapters 6 and 7.*

Bill Venners, "The Java Virtual Machine", Jan. 2000, McGraw-Hill, printed online on May 13, 2004, archived on Aug. 31, 2000 at <http://web.archive.org/web/20000831021759/www.artima.com/insidejvm/ed2/ch05JavaVirtualMachinePrint.html>, ISBN 0071350934, Chapter 5.*

(Continued)

*Primary Examiner*—Tuan Dam
*Assistant Examiner*—J. Derek Rutten
(74) *Attorney, Agent, or Firm*—Dorsey & Whitney LLP (57) ABSTRACT

Improved techniques for representation of Java data types in virtual machines are disclosed. The techniques can be implemented to represent signatures of Java methods as arrays of references. Each of the references in an array can represent a parameter for a Java method. Accordingly, a signature can be represented as an array of references, wherein each reference in the array can reference a Java type indicator or an internal class representation. The Java type indicator represents a Java primitive type (e.g., byte, integer, double, etc.) The internal class representation is typically the representation of a Java class as represented in a virtual machine. As will be appreciated, an array organization allows for more efficient access to information. Thus, unlike conventional techniques, there is no need to start at the beginning of the signature and sequentially read it to find a particular parameter's data type. In addition, the internal class representations can be accessed directly from the method signature representation. This allows for quick access to the internal class representations from the signature, therefore, less processing is needed to execute methods. As a result, the performance of virtual machines, especially those operating with limited resources, can be improved.

16 Claims, 6 Drawing Sheets

OTHER PUBLICATIONS

Gosling, Joy, Steele, "The Java Language Specification", 1996, Addison-Wesley, ISBN 0-201-63451-1, Chapters 4, and 13, and Section 8.4.*

Alpern, Cocchi, and Grove, "Dynamic Type Checking in Jalaneno", Apr. 2001, USENIX, Proceedings of the Java Virtual Machine Research and Technology Symposium (JVM'01), pp.*

Alpern et al., "The Jalapeno Virtual Machine", 2000, IBM Systems Journal, vol. 39, No. 1.*

Alpern et al., "Implementing Jalapeno in Java", 1999, Proceedings of the 14th ACM SIGPLAN Conference on Object-Oriented Programming, Systems, Languages, and Applications, ISBN 1-58113-238-7, pp. 314-324.*

Forman, Conner, Danforth, and Raper, "Release-to-release Binary Compatibility in SOM", 1995, Proceedings of the tenth annual conference on Object-oriented programming systems, languages, and applications, ISSN 0362-1340, pp. 426-438.*

Ingalls, Kaehler, Maloney, Wallace, and Kay, "Back to the future: The story of Squeak, a practical Smalltalk written in itself", 1997, Proceedings of the 12th ACM SIGPLAN on OOPSLA, ISSN 0362-1340, pp. 318-326.*

Allen Goldberg, "A Specification of Java Loading and Bytecode Verification", 1998, ACM, 5th Conference on Computer & Communications Security, pp. 49-58+.*

Dave Marshall, "Pointers", May 1999, Accessed and printed online Nov. 5, 2004, <http://web.archive.org/web/19990508132024/http://www.cs.cf.ac.uk/Dave/C/node10.html>.*

Lindholm et al, "The Java™ Virtual Machine Specification", (Sep. 1996), Sun Microsystems, Inc., Chapters 1-10 (173 pp.).

* cited by examiner

Fig. 1A

PRIOR ART

Fig. 1B

PRIOR ART

REPRESENTATION OF JAVA® DATA TYPES IN VIRTUAL MACHINES

BACKGROUND OF THE INVENTION

The present invention relates generally to object-based high level programming environments, and more particularly, to techniques for tracking references to objects defined in object-based high level programming environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web"), which is an interface protocol for the Internet which allows communication of diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition,* by Tim Lindholm and Frank Yellin, which is hereby incorporated herein by reference.

Figure 1A:
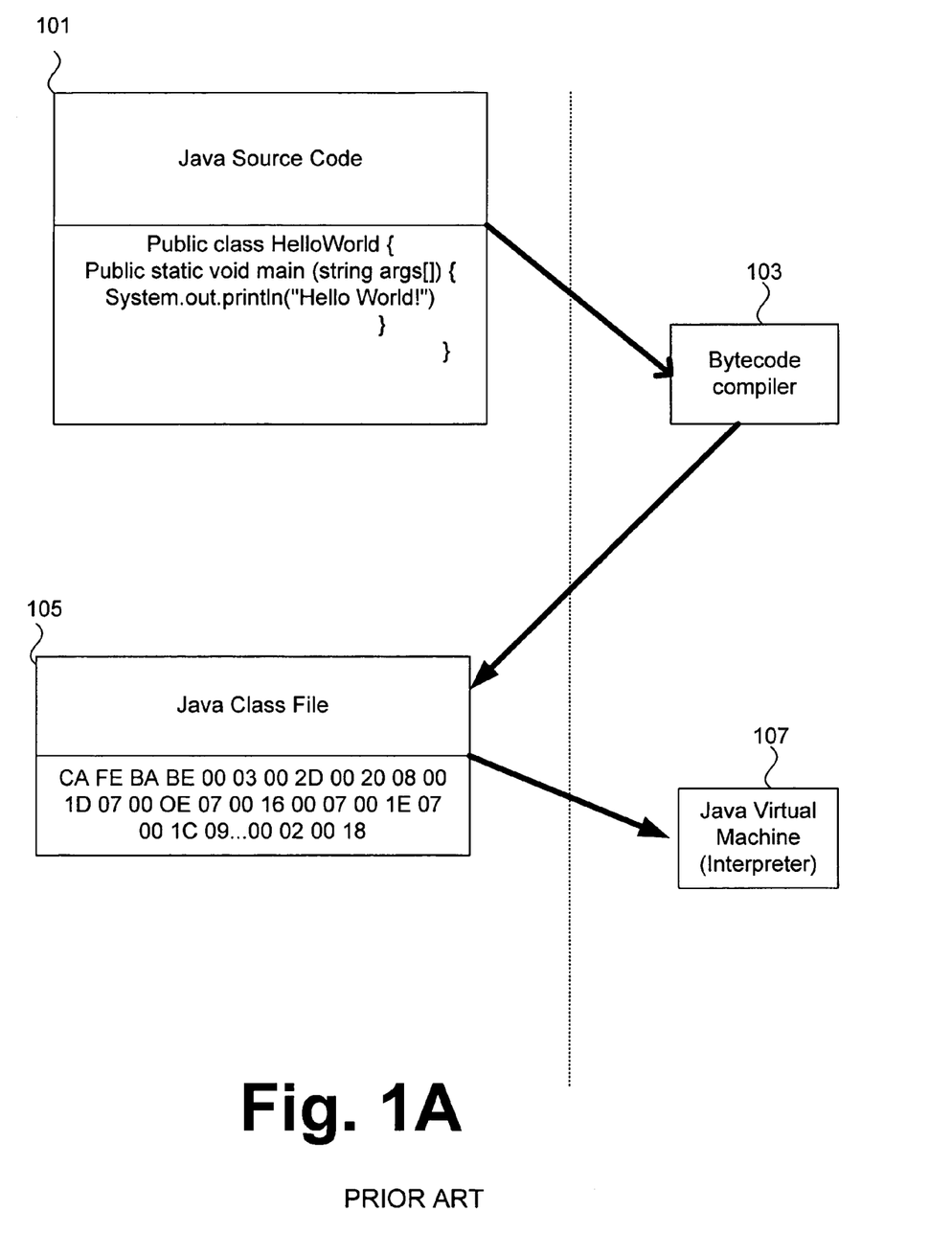
FIG. 1A shows a progression of a simple piece of Java source code through execution by an interpreter, the Java virtual machine.

FIG. 1A shows a progression of a simple piece of Java source code through execution by an interpreter, the Java virtual machine. Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

Typically, the data types supported by the Java programming language are supported by Java virtual machine implementations. This means that both primitive and reference Java data types are supported by Java virtual machine implementations. The primitive Java data types are relatively simpler and include integral types (e.g., byte, short, int, long, char). As such, the values of the integral types of the Java virtual machines are the same as those for the integral types of the Java programming language. However, the reference data types have values that can be references to dynamically created class instances, or arrays (or class instances, or arrays that implement interfaces). It should also be noted that the reference data types are internally represented by the virtual machine.

Figure 1B:
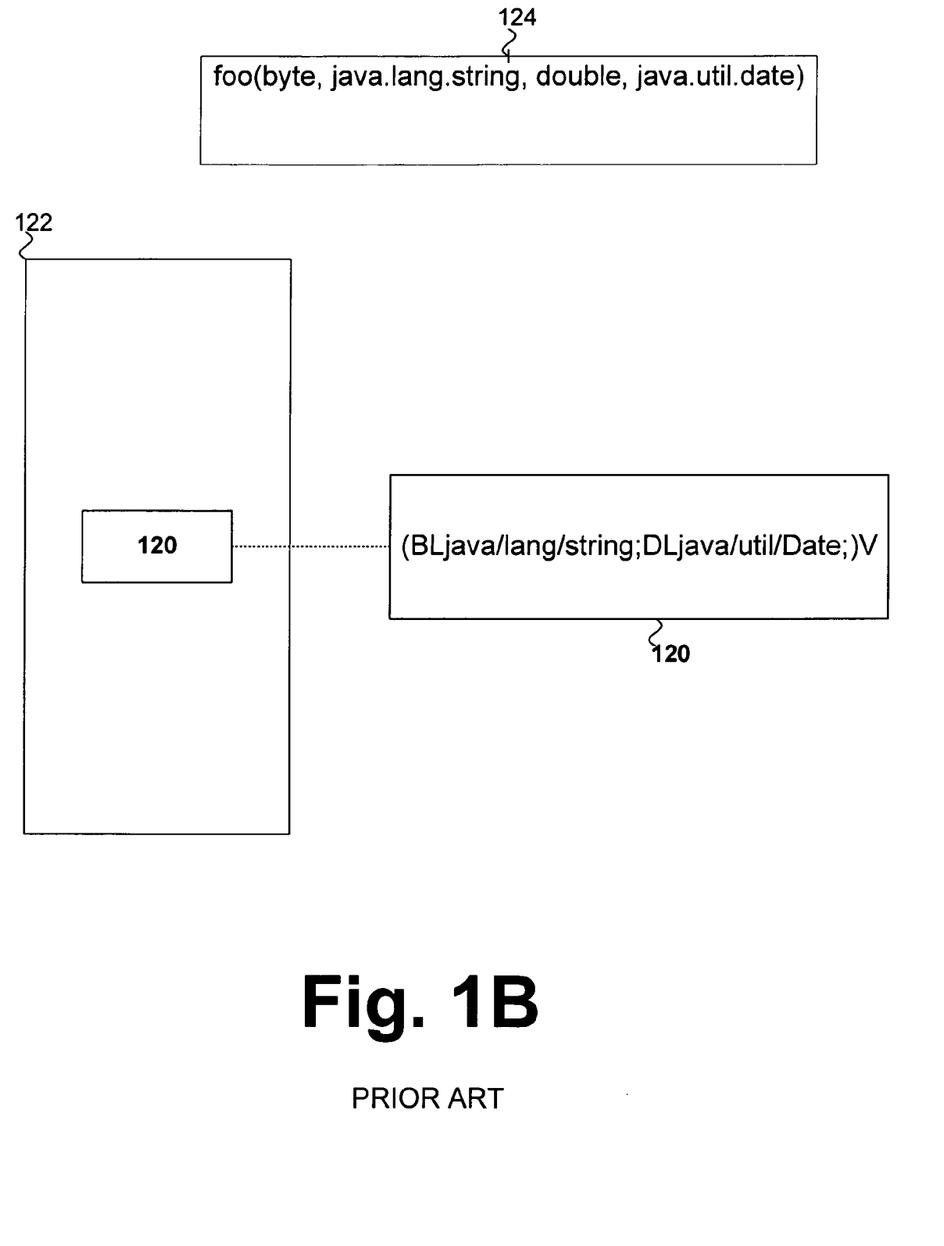
FIG. 1B depicts a method signature in an internal method representation which is generated by a virtual machine.

In any case, the virtual machine needs to represent data types for various reasons, for example, to represent method signatures. A method signature describes the parameters and return type of a particular method. To illustrate, FIG. 1B depicts a method signature 120 in an internal method representation 122 which is generated by a virtual machine. The method signature 120 corresponds to a method "foo" 124. The method foo 124 has four parameters, namely, "byte", "java.lang.string", "double" and "java.util.date". The signature 120 represents the data type of these four parameters. As such, the character "B" indicates that the first parameter is a "byte" type, "Ljava/lang/string" indicates that the second parameters is a "string" type, "D" indicates that the third parameter is a "double" type, and "Ljava/util/date" indicates that the fourth parameter is a "date" type. It should be noted that string and date represent reference data types. Accordingly, there may be a need to access the string and date classes in order to execute the method. In other words, there may be a need to locate the internal representation for classes associated with the reference data types (e.g., string and date data types). This means that to execute a method, the virtual machine has to do some processing to parse the signature and determine the data type for the parameters.

One problem with the conventional representation of Java data types is that the method signatures have to be read sequentially since data types can have various lengths. This means that the method signature has to be sequentially scanned from the beginning in order to access a particular parameters' data type. Furthermore, after the data type has been determined, there is a need to perform more processing to locate the class internal representation of the method's parameters (e.g., look it up in a table). The amount of processing required to sequentially read and then find the appropriate internal class representation can adversely affect the performance of virtual machines. This can seriously hinder the performance of virtual machines, especially those operating with relatively limited computing power (e.g., embedded systems).

In view of the foregoing, there is a need for improved techniques for representation of Java data types in virtual machines.

SUMMARY OF THE INVENTION

Broadly speaking, the present invention relates to representation of Java data types in virtual machines. Accordingly, the invention provides improved techniques for representation of Java data types in virtual machines. In accordance with one aspect of invention, signatures of Java methods can be represented in arrays of references. In one embodiment, each of the references in an array represents a parameter for a Java method. Accordingly, a signature can be represented as an array of references, wherein each reference in the array can reference a Java type indicator or an internal class representation. The Java type indicator represents a Java primitive type (e.g., byte, integer, double, etc.) The internal class representation is typically the representation of a Java class as represented in a virtual machine.

As will be appreciated, an array organization allows for more efficient access to information. Thus, unlike conventional techniques, there is no need to start at the beginning of the signature and sequentially read it to find a particular parameters' data type. In addition, the invention allows for the internal class representations to be directly accessed from the method signature representation. This allows for quick access to the internal class representations from the signature, and therefore, less processing is needed to execute methods. As a result, the invention can improve the performance of virtual machines, especially those operating with limited resources.

The invention can be implemented in numerous ways, including as a method, an apparatus, a computer readable medium, and a database system. Several embodiments of the invention are discussed below.

As a Java data type representation suitable for use by a Java virtual machine, one embodiment of the invention includes one or more data type indicators. Each one of the data type indicators represents a Java primitive type and an array of references. In addition, at least one reference in the array of references is referencing one of the one or more data type indicators.

As a Java method signature representation suitable for use in a Java virtual machine, one embodiment of the invention includes an array of references. Each reference in the array of references represents a parameter for a Java method such that an $i^{th}$ entry of the array of references corresponds to an $i^{th}$ parameter of the Java method, where i is a positive integer. Each one of references of the array of references reference a Java type indicator associated with a Java primitive type or an internal class representation associated with a Java class.

As a method of representing Java method signatures associated with Java methods with one or more parameters, one embodiment of the invention includes the acts of: determining whether a parameter has a primitive Java data type; assigning a reference in an array of references to a data type indicator that represents a Java primitive data type when the determining determines that the parameter has a primitive Java data type; and assigning a reference in an array of references to an internal class representation associated with a Java class when the determining determines that the parameter does not have a primitive data type.

As a computer readable media including computer program code for representing Java method signatures associated with Java methods with one or more parameters, one embodiment of the invention includes computer program code for determining whether a parameter has a primitive Java data type; computer program code for assigning a reference in an array of references to a data type indicator that represents a Java primitive data type when the determining determines that the parameter has a primitive Java data type; and computer program code for assigning a reference in an array of references to an internal class representation associated with a Java class when the parameter does not have a primitive data type.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for representation of Java data types in virtual machines. In accordance with one aspect of invention, signatures of Java methods can be represented in arrays of references. In one embodiment, each of the references in an array represents a parameter for a Java method. Accordingly, a signature can be represented as an array of references, wherein each reference in the array can reference a Java type indicator or an internal class representation. The Java type indicator represents a Java primitive type (e.g., byte, integer, double, etc.) The internal class representation is typically the representation of a Java class as represented in a virtual machine.

As will be appreciated, an array organization allows for more efficient access to information. Thus, unlike conventional techniques, there is no need to start at the beginning of the signature and sequentially read it to find a particular parameters' data type. In addition, the invention allows for the internal class representations to be accessed directly from the method signature representation. This allows for quick access to the internal class representations from the signature, and therefore, less processing is needed to execute methods. As a result, the invention can improve the performance of virtual machines, especially those operating with limited resources (e.g., embedded systems).

Embodiments of the invention are discussed below with reference to FIGS. 2A–5. However, those skilled in the art will readily appreciate that the detailed description given herein with respect to these figures is for explanatory purposes only as the invention extends beyond these limited embodiments.

Figure 2A:
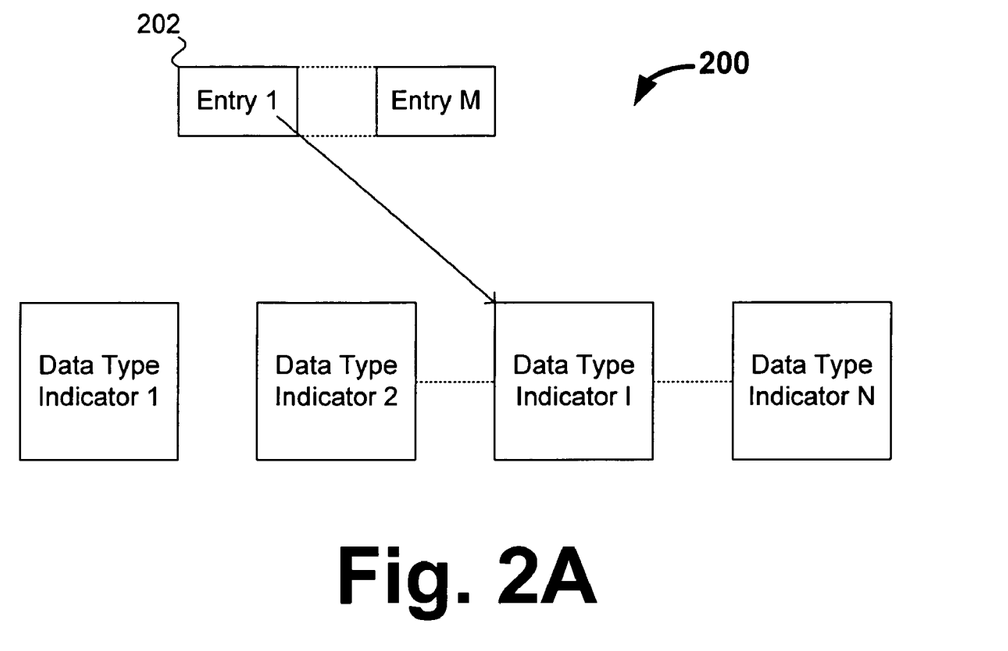
FIG. 2A–B illustrate Java data type representation in accordance with one embodiment of the invention.

FIG. 2A illustrates a Java data type representation 200 in accordance with one embodiment of the invention. The Java data type representation 200 includes an array of references (e.g., pointers) 202 which include a series of references represented as entries 1 to M. Each of these entries can reference a data type indicator. For example, entry 1 of the array of references 202 can reference (e.g., point to) a data type indicator 1. As will be appreciated, each of the primitive Java data types can be represented by the data type indicators 1 to N (i.e., be set to a particular value, for example, a string or an integer value to indicate a particular type). For example, data type indicators 1, 2, 3, and 4 can respectively represent the Java byte, integer, double, and character types. Thus, each of the entries of the array of references 202 can reference a primitive data type indicator.

Figure 2B:
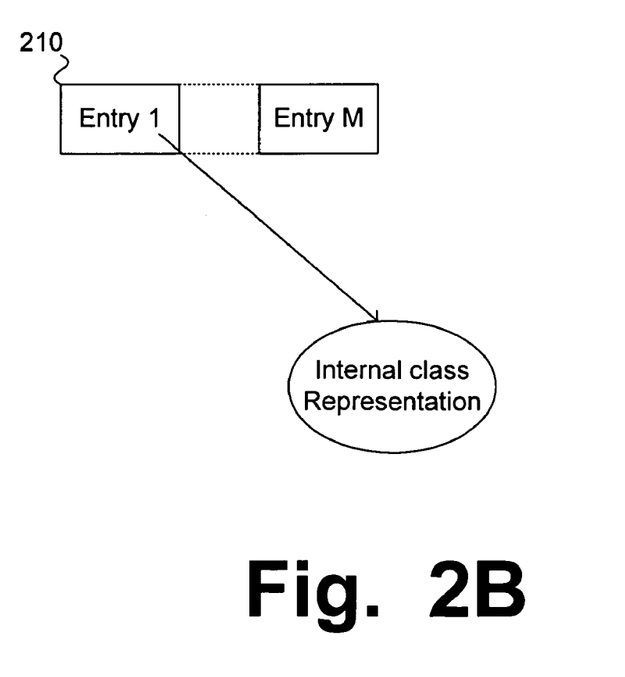
Figure 2C:
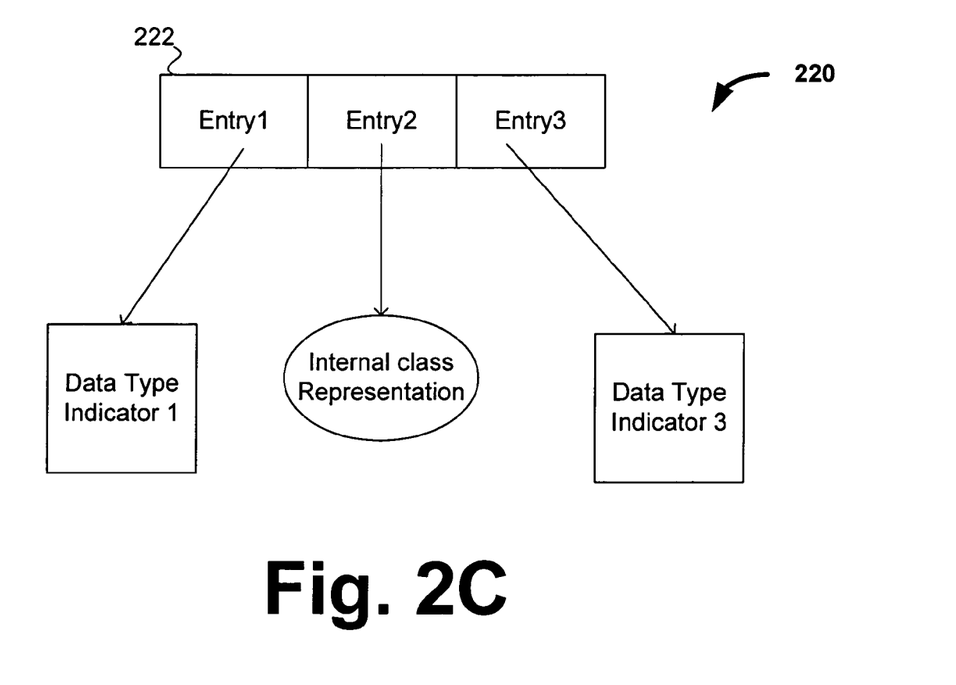
FIG. 2C depicts a representation of a method's signature in accordance with one embodiment of the invention.

As illustrated in FIG. 2B, an entry in an array of references 210 can also reference an internal class representation. This means that in addition to primitive Java data types, an array of references can also be used to represent reference Java data types. Accordingly, reference arrays can be used to, among other things, represent method's signatures. To illustrate, FIG. 2C depicts a representation of a method's signature 220 in accordance with one embodiment of the invention. The method's signature 220 represents a signature for a method with three parameters. Each of these parameters is represented by an entry in the array of references 222.

Figure 3:
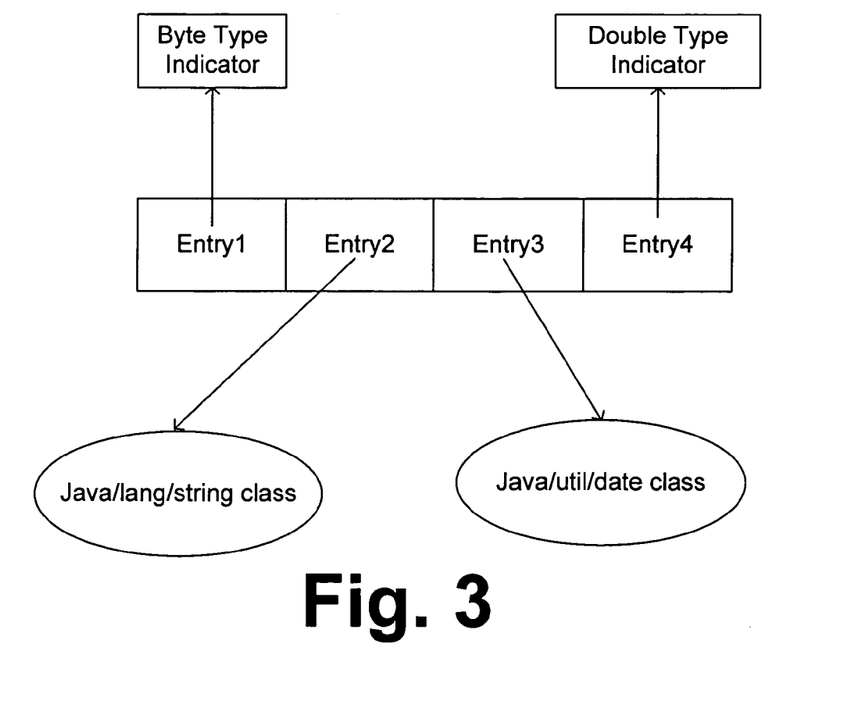
FIG. 3 illustrates how a method signature may be represented in accordance with one embodiment of the invention.

As shown, in FIG. 2O, entries 1, 2, and 3 of the array of references 222, respectively reference data type indicator 1, internal class representation 1, and data type indicator 3. In other words, parameters 1, 2, and 3 of the method represented by the method signature 220 respectively have data types represented by data type indicator 1, internal class representation 1, and data type indicator 3. As another example, FIG. 3 illustrates how the method signature 120 of FIG. 1 may be represented in accordance with one embodiment of the invention.

It should be noted that the internal class representations can be accessed directly from the method signature representation in accordance with one embodiment of the invention. This allows quick access to the internal class representations from the signature. As will be appreciated, less processing is needed to execute methods since internal representations can be accessed directly. As a result, the performance of virtual machines, especially those operating with limited resources can be improved.

Furthermore, the organization of method signature 220 allows for efficient access to various parameters of method signatures. By way of example, a particular parameter can be easily accessed by using the appropriate index (i.e., the third parameter is the 3rd index, the fifth parameter is the $5^{th}$ index in the array, and so on). Thus, unlike conventional techniques, there is no need to start at the beginning of the signature and sequentially read it to find a particular parameter's data type.

Figure 4:
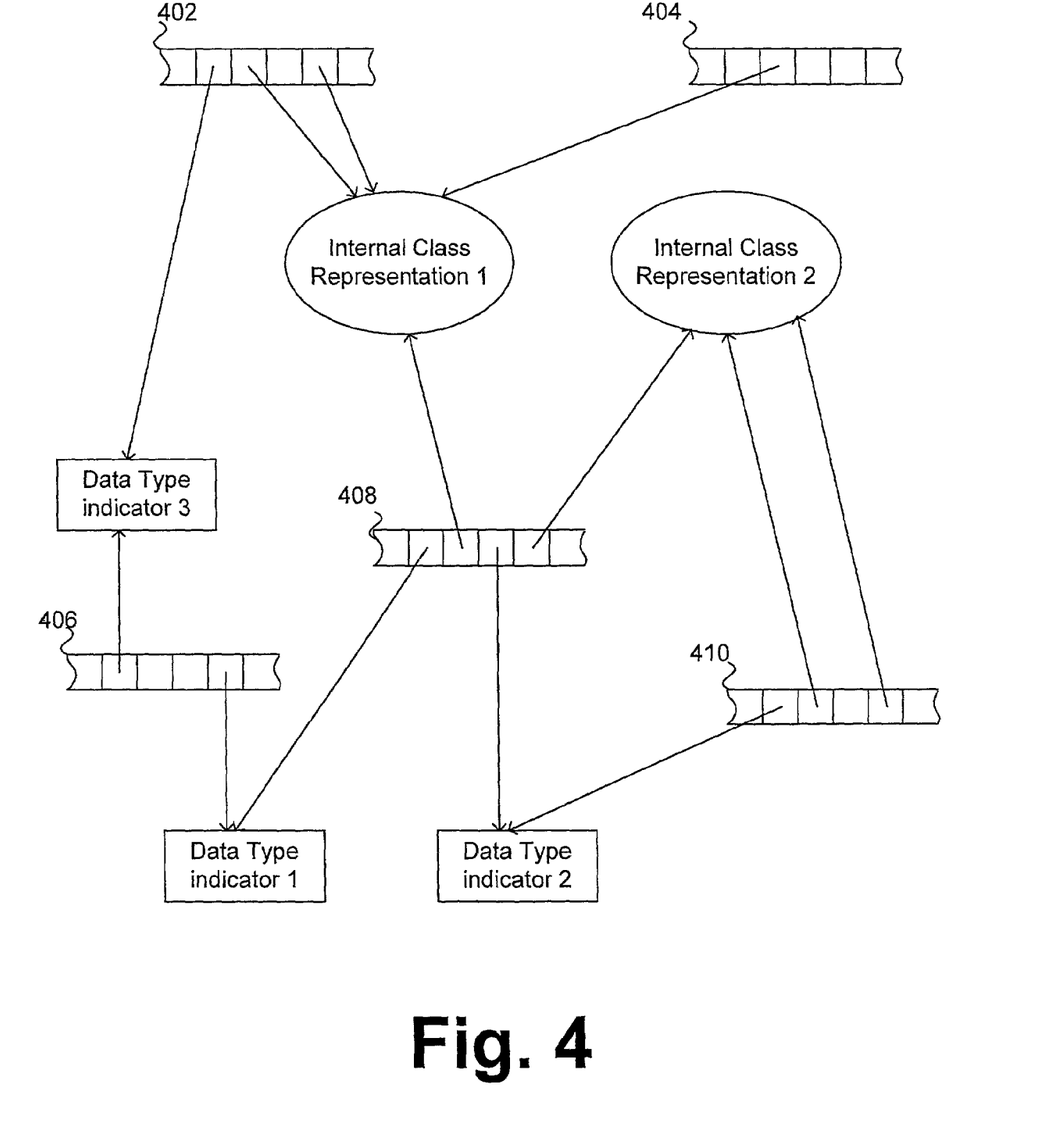
FIG. 4 depicts several method signature representations in accordance with one embodiment of the invention.

As noted above, method signatures can be represented in an efficient manner in accordance with one aspect of the invention. It should also be noted that entries of different signature methods can reference the same data type indicator or internal class representation. In fact, there is a need to allocate one data type indicator for each Java data type. FIG. 4 depicts several method signature representations in accordance with one embodiment of the invention. Each of the method signature representations 402, 404, 406, 408 and 410 represent an array of references. As illustrated in FIG. 4, each of the internal class representations 1 and 2 can be referenced by two or more array reference entries. These array entries can be entries of the same array of references (e.g., method signature 410). Moreover, array entries in two different method signatures can reference the same data type indicator or internal class representation (e.g., entries in method signature representation 408 and 410 reference the internal class representation 2).

Figure 5:
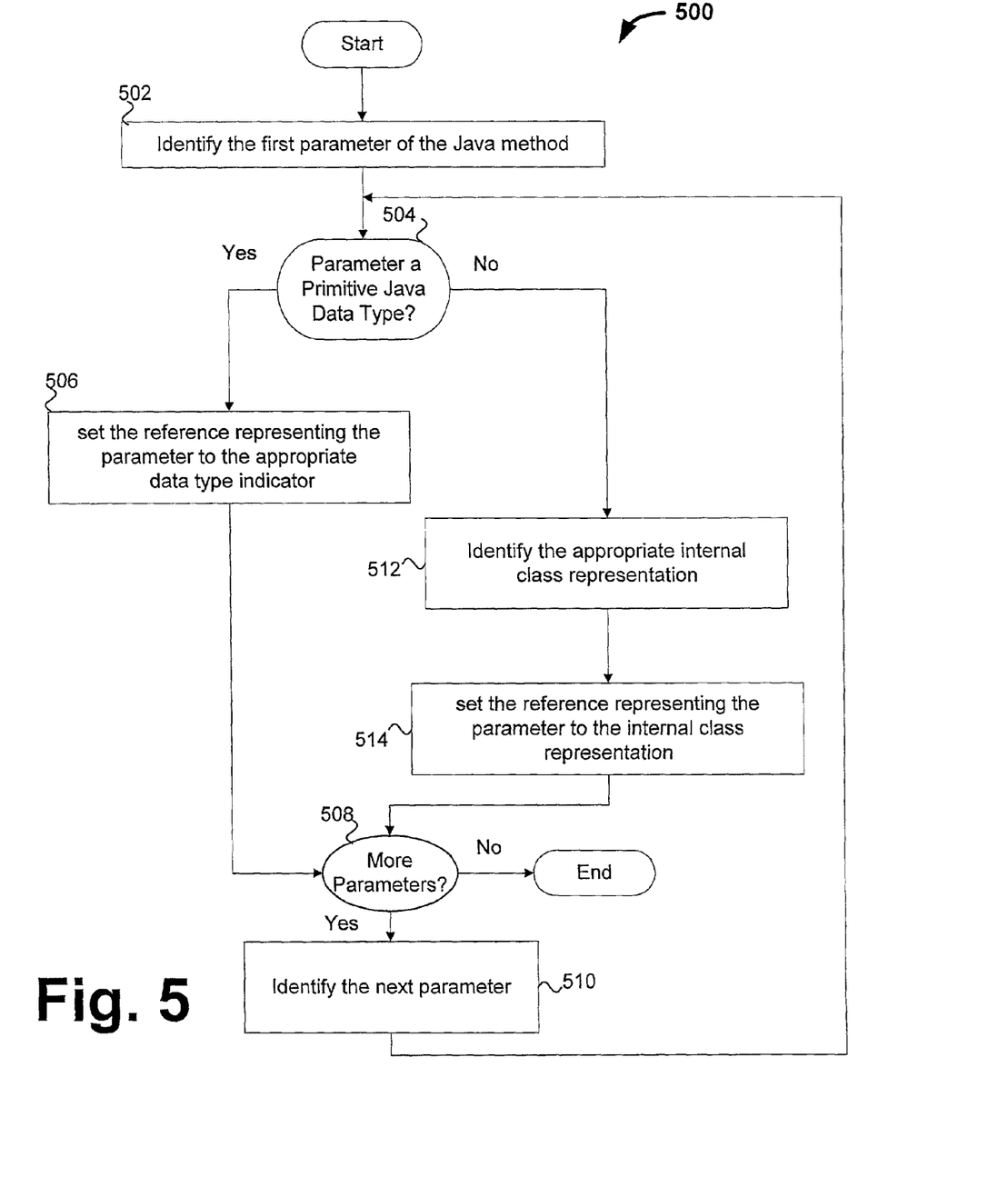
FIG. 5 illustrates a method of representing a signature for a Java method with one or more parameters in accordance with one embodiment of the invention.

FIG. 5 illustrates a method 500 of representing a signature for a Java method with one or more parameters in accordance with one embodiment of the invention. The method 500 can be implemented, for example, in a Java virtual machine, to represent parameters of Java methods as an array of references. Each of the parameters of the Java method can be represented as a reference in the array of references. Initially, at operation 502, the first parameter of the Java method is identified. Next, at operation 504, a determination is made as to whether the parameter corresponds to a primitive Java data type (e.g., Byte, Integer, etc.) If it is determined at operation 504 that the parameter corresponds to a primitive Java data type, the method 500 proceeds to operation 506 where the reference representing the parameter in the array of references is set to the appropriate data type indicator. After the reference has been set to the appropriate data type indicator, the method 500 proceeds to operation 508 where it is determined whether there are more parameters to process. If it is determined at operation 508 that there are no more parameters to process, the method 500 ends. However, if it is determined at operation 508 that there is at least one parameter to process, the method 500 proceeds to operation 510 where the next parameter of the method is identified. Next, the method proceeds to operation 504 where a determination is made as to whether the parameter corresponds to a primitive Java data type. Thereafter, the method 500 proceeds in the same manner as discussed above.

However, if it is determined at operation 504 that the parameter does not correspond to a primitive Java data type (i.e., parameter corresponds to a reference object), the method 500 proceeds to operation 512 where the appropriate internal class representation for the parameter is identified. Next, the method 500 proceeds to operation 514 where the reference representing the parameter in the array of references is set to the internal class representation. After the reference has been set to the internal class representation, the method 500 proceeds to operation 508 where it is determined whether there are more parameters to process. Thereafter, the method 500 proceeds in the same manner as discussed above. When it is determined that the method does not have any more parameters to process, the method 500 ends.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable medium including at least computer program code for representing data types of a platform-independent programming language in a virtual machine, wherein said computer medium comprises computer program code to perform the method comprising:

storing a predetermined set of primitive data type indicators inside said virtual machine, wherein each one of said primitive data type indicators can be independently and directly referenced by a reference and each one of said primitive data type indicators represents only one primitive data type of said platform-independent programming language, and wherein all primitive data types of said platform-independent programming language are represented by said set of primitive data type indicators;

storing an array of references suitable for representing data types inside said virtual machine, wherein said array of references is a data structure defined by said platform-independent programming language and has been allocated as an arranged sequence of references, wherein each of said references can directly and independently reference data by referring to the address where said data is stored, wherein each of said references in said array of references have the same fixed allocation size, thereby allowing each of said references to be uniquely identified by an expression consisting of an array name followed by an index;

accessing at least one reference in said array of references which is directly referencing a primitive data type indicator in said set of primitive data type indicators; and accessing at least one other reference in said array of references which is directly referencing the address of an internal class representation that has been stored inside said virtual machine, wherein said internal class representation is a representation of a class of said platform-independent programming language which has been loaded inside said virtual machine, thereby allowing said internal class representation to be accessed by directly referencing said at least one other reference in said array of references.

2. A computer readable medium as recited in claim 1, wherein each one of said references in said array of references represent a parameter of a method.

3. A computer readable medium as recited in claim 1, wherein two or more references in said array of references reference the same primitive data indicator.

4. A computer readable medium as recited in claim 1, wherein two or more in said array of references reference the same internal class representation.

5. A computer readable medium as recited in claim 1, wherein each reference in said array of references represents a parameter for a method such that the $i^{th}$ entry of the array of references corresponds to the $i^{th}$ parameter of said method, and wherein i is a positive integer.

6. A computer readable medium including at least computer program code for representing a method signature inside a virtual machine, wherein said method signature is associated with a platform-independent programming language, and wherein said computer readable medium comprises computer program code to perform the method comprising:

storing a predetermined set of primitive data type indicators inside said virtual machine, wherein each one of said primitive data type indicators are allocated and can be independently and directly referenced by a reference and each one of said primitive data types represents only one primitive data type of said platform-independent programming language, and wherein all primitive data types of said platform-independent programming language are represented by said set of primitive data type indicators;

providing and accessing a method signature representation comprising an array of references wherein said array of references is a data structure defined by said platform-independent programming language and has been allocated as an arranged sequence of references, wherein each of said references can directly and independently reference data by referring to the address where said data is stored, wherein each of said references in said array of references have the same fixed allocation size, thereby allowing each of said references to be uniquely identified by an expression consisting of an array name followed by an index, wherein each reference in said array of references represents a parameter for a method such that an $i^{th}$ entry of the array of references corresponds to an $i^{th}$ parameter of said method, and wherein i is a positive integer; and wherein each one of said references of said array of references directly references a primitive data type indicator of said set of primitive data type indicators or directly references the address of an internal class representation stored inside said virtual machine, wherein said internal representation is a representation a class of said programming language which has been loaded inside said virtual machine, thereby allowing said internal class representation to be accessed by directly referencing a reference in said array of references.

7. A computer readable medium as recited in claim 6, wherein the data type for an $i^{th}$ parameter of said method can be accessed without sequentially reading said array of references from its beginning.

8. A computer readable medium as recited in claim 7, wherein two or more references in said array of references reference the same primitive data indicator.

9. A computer readable medium as recited in claim 6, wherein two or more references in said array of references reference the same internal class representation.

10. A computer readable medium as recited in claim 6, wherein two or more references in said array of references reference the same internal class representation associated with a class.

11. A computer-implemented method of representing method signatures of a platform-independent programming language inside a virtual machine, wherein said method signatures are associated with methods with one or more parameters, said method comprising:

storing a predetermined set of primitive data type indicators inside said virtual machine, wherein each one of said primitive data type indicators can be independently and directly referenced by a reference and each of said primitive data type indicators represents only one primitive data type of said platform-independent programming language, and wherein all primitive data types of said platform-independent programming language are represented by said set of primitive data type indicators;

determining whether a parameter of a method is of a primitive data type;

assigning a reference in an array of references in said virtual machine to a primitive data type indicator that represents a primitive data type when said determining determines that said parameter is of a primitive data type, wherein said array of references is a data structure defined by said platform-independent programming language and has been allocated as an arranged sequence of references which each can directly and independently reference data by referring to the address where said data is stored, wherein each of said references in said array of references have the same fixed allocation size, thereby allowing each of said references to be uniquely identified by an expression consisting of an array name followed by an index; and assigning a reference in an array of references to an address of an internal class representation associated with a class of said programming language which has been internally represented and stored in said virtual machine when said determining determines that said parameter is not of a primitive data type, thereby allowing said internal class representation to be accessed by directly referencing a reference in said array of references.

12. A computer-implemented method as recited in claim 11, wherein said internal class representation can be accessed by using said reference in said array of references without further processing.

13. A computer-implemented method as recited in claim 11, wherein references in said array of references, are direct references thereby allowing access to data types of said parameters without requiring further processing.

14. A computer system, comprising;
    memory;
    at least one processor configured to access said memory,
    a virtual machine supported by said at least one processor, wherein said virtual machine represents data types of a platform independent programming and operates to:
    store a predetermined set of primitive data type indicators inside said virtual machine, wherein each one of said primitive data type indicators can be directly and independently referenced by a reference and each one of said primitive data types represents only one primitive data type of said platform-independent programming language, and wherein all primitive data types of said platform-independent programming language are represented by said set of primitive data type indicators;
    store an array of references suitable for representing data types inside said virtual machine, wherein said array of references is a data structure defined by said platform-independent programming language and has been allocated as an arranged sequence of references which each can directly and independently reference data by referring to the address where said data is stored, wherein each of said references in said array of references have the same fixed allocation size, thereby allowing each of said plurality of references to be uniquely identified by an expression consisting of an array name following by an index;
    wherein at least one reference in said array of references is directly referencing a primitive data type indicator in said set of primitive data type indicators; and
    wherein at least one other reference in said array of references is directly referencing the address of an internal class representation which has been stored inside said virtual machine, wherein said internal class representation is a representation of a class of said platform-independent programming language which has been loaded inside said virtual machine, thereby allowing said internal class representation to be accessed by directly referencing said at least one other reference in said array of references.

15. A framework embodied in a computer readable medium for representing a method signature for a method executed by a virtual machine that executes computer program code written in a platform-independent programming language, wherein said method signature identifies the data types of one or more method-parameters of said method, wherein said data types include a primitive data type and a reference data type of said platform-independent programming language, and wherein said reference data type refers to a class that more specifically identifies the type of said reference data type, said framework comprising:
    a set of primitive data type indicators embodied in said computer readable medium, said set of primitive data type indicators representing all primitive data types of said platform-independent programming language, wherein each one of said primitive data type indicators can be independently and directly referenced;
    a set of internal class representations embodied in said computer readable medium, said set of internal class representations representing a set of classes internally in said virtual machine; and
    a method signature embodied in said computer readable medium for a method that has one or more associated method-parameters, said method signature identifying data types for each of said one or more method-parameters, wherein each of said one or more method-parameters are represented by an element of an array of references, and wherein said element directly and independently references a primitive data type indicator in said set of primitive data type indicators or an internal class representation in said set of internal class representations, thereby allowing the type of a first method parameter of said method to be determined based on a first element of said array of references and a first internal class representation to be directly accessed by accessing said first element when said first element references said first internal class representation; and
    wherein said virtual machine accesses said method signature in order to execute the method.

16. A framework as recited in claim 15, wherein said array consists of an array name and an index.

* * * * *